US006631100B2

(12) United States Patent
Utsumi

(10) Patent No.: US 6,631,100 B2
(45) Date of Patent: Oct. 7, 2003

(54) RECORDING APPARATUS, RECORDING METHOD, AND DUBBING APPARATUS FOR RECORDING OR DUBBING PROGRAMS AND CHARACTER DATA

(75) Inventor: Yoshimasa Utsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/145,889

(22) Filed: Sep. 2, 1998

(65) Prior Publication Data

US 2001/0043524 A1 Nov. 22, 2001

(30) Foreign Application Priority Data

Sep. 11, 1997 (JP) ........................................... 9-246531

(51) Int. Cl.[7] ............................................... G11B 21/08

(52) U.S. Cl. ................ 369/30.27; 369/30.9; 369/47.13; 369/83; 369/84

(58) Field of Search ............................. 369/47, 58, 83, 369/84; 707/535; 704/3

(56) References Cited

U.S. PATENT DOCUMENTS

| | | | | |
|---|---|---|---|---|
| 4,777,600 A | * 10/1988 | Saito et al. | 707/535 |
| 5,131,766 A | * 7/1992 | Wong | 707/535 |
| 5,319,552 A | * 6/1994 | Zhong | 707/535 |
| 5,321,843 A | * 6/1994 | Shoji et al. | 707/3 |
| 5,535,119 A | * 7/1996 | Ito et al. | 704/3 |
| 5,610,888 A | * 3/1997 | Hiranuma | 369/84 X |
| 5,625,610 A | * 4/1997 | Hiranuma | 369/47 |
| 5,689,704 A | * 11/1997 | Yoshida et al. | 707/104 |
| 5,701,498 A | * 12/1997 | Goach, Jr. et al. | 395/762 |
| 5,719,841 A | * 2/1998 | Chen | 369/59 |
| 5,893,133 A | * 4/1999 | Chen | 707/535 |

FOREIGN PATENT DOCUMENTS

JP 60-181869 * 9/1985

OTHER PUBLICATIONS

Dictionary of Computers,Information Processing, and Telecommunications 2nd Edition, J.Rosenberg, Wiley & Sons, © 1984, 1987 p. 164.*

* cited by examiner

*Primary Examiner*—Aristotelis M. Psitos
(74) *Attorney, Agent, or Firm*—Oblon, Spivak, McClelland, Maier & Neustadt, P.C.

(57) ABSTRACT

A recording apparatus comprising a means for reading and reproducing a program recorded on a first recording medium such as a CD; a means for recording the reproduced program on a second recording medium such as an MD having at least a program area to record programs and a management area to manage the positions of the recorded programs and the program names; a means for inputting character data representative of the program name; a means for settling the program of one unit inputted by the character input means; a means for generating a partition code; a means for storing the program name as a character string after attaching a partition code to the program name inputted by the character input means; and a control means for extracting, from the character strings stored in the storage means, the program name of the relevant program with reference to the partition code, and updating the data in the management area of the second recording medium. In this apparatus, successive input of character data as program names is achievable despite change of programs, and the recorded management data can be updated independently of such change after completion of dubbing the entire programs.

10 Claims, 8 Drawing Sheets

MANIPULATED FOR CHARACTER INPUT MODE? (S001) NO / YES
PROCEED TO CHARACTER INPUT MODE (S002)
CHARACTER INPUTTED? (S003) NO / YES
ADD INPUT CHARACTER TO CHARACTER STRING (S004)
ENTER KEY MANIPULATED? (S005) NO / YES
ADD TRACK NAME SETTLE CODE TO CHARACTER STRING (S006)
CHARACTER INPUT MODE ENDED? (S007) NO / YES
IN RECORDING MODE? (S008) YES / NO
RECORDING MODE ENDED? (S010) NO / YES
SETTLE INPUT CHARACTER STRING AS TRACK NAME WITH REFERENCE TO TRACK NAME SETTLE CODE, AND UPDATE U-TOC SECTOR 1 (S009)

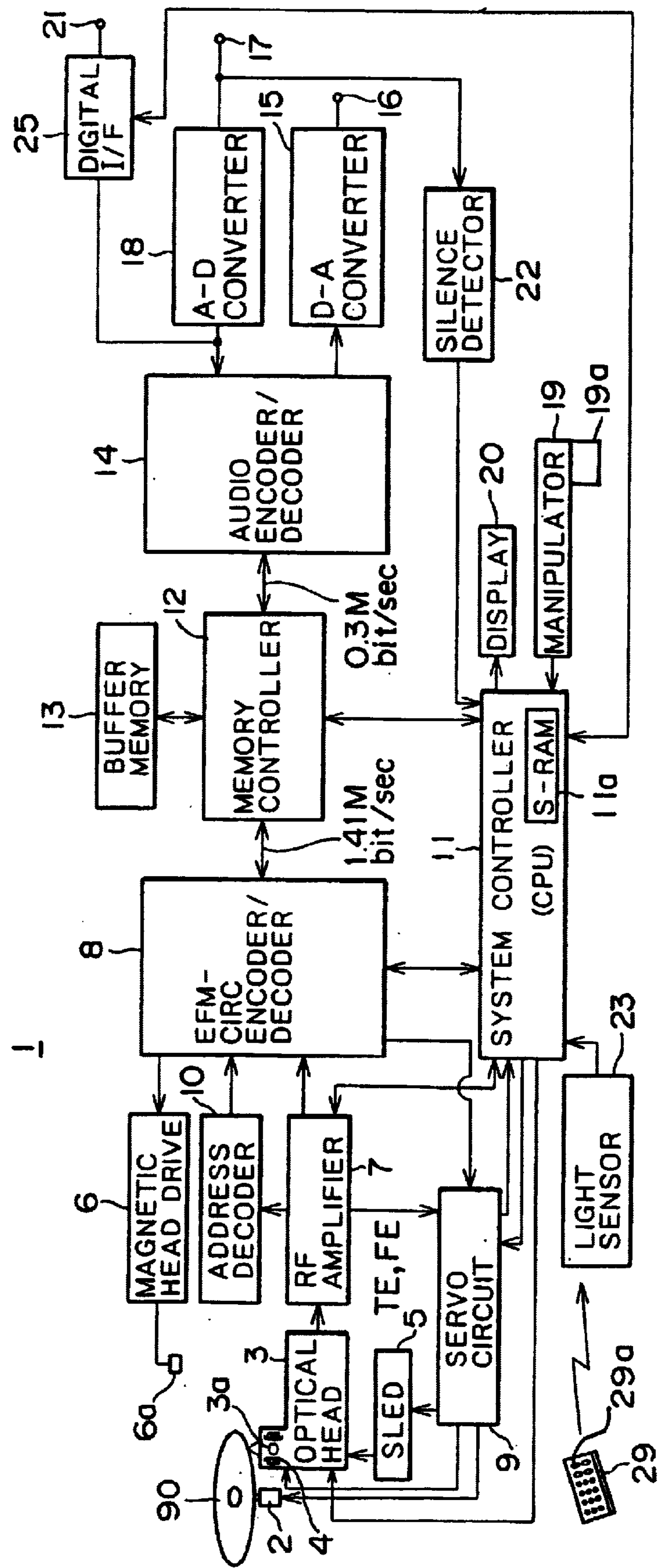
F I G . 1
1
DIGITAL I/F
A-D CONVERTER
D-A CONVERTER
SILENCE DETECTOR
AUDIO ENCODER/ DECODER
BUFFER MEMORY
MEMORY CONTROLLER
0.3M bit/sec
1.41M bit/sec
EFM-CIRC ENCODER/ DECODER
SYSTEM CONTROLLER (CPU)
S-RAM
DISPLAY
MANIPULATOR
MAGNETIC HEAD DRIVE
ADDRESS DECODER
RF AMPLIFIER
TE,FE
SERVO CIRCUIT
LIGHT SENSOR
OPTICAL HEAD
SLED
21
17
16
15
25
18
22
14
13
12
11
11a
20
19
19a
8
10
6
7
23
3
3a
5
6a
90
2
4
9
29
29a

FIG. 3

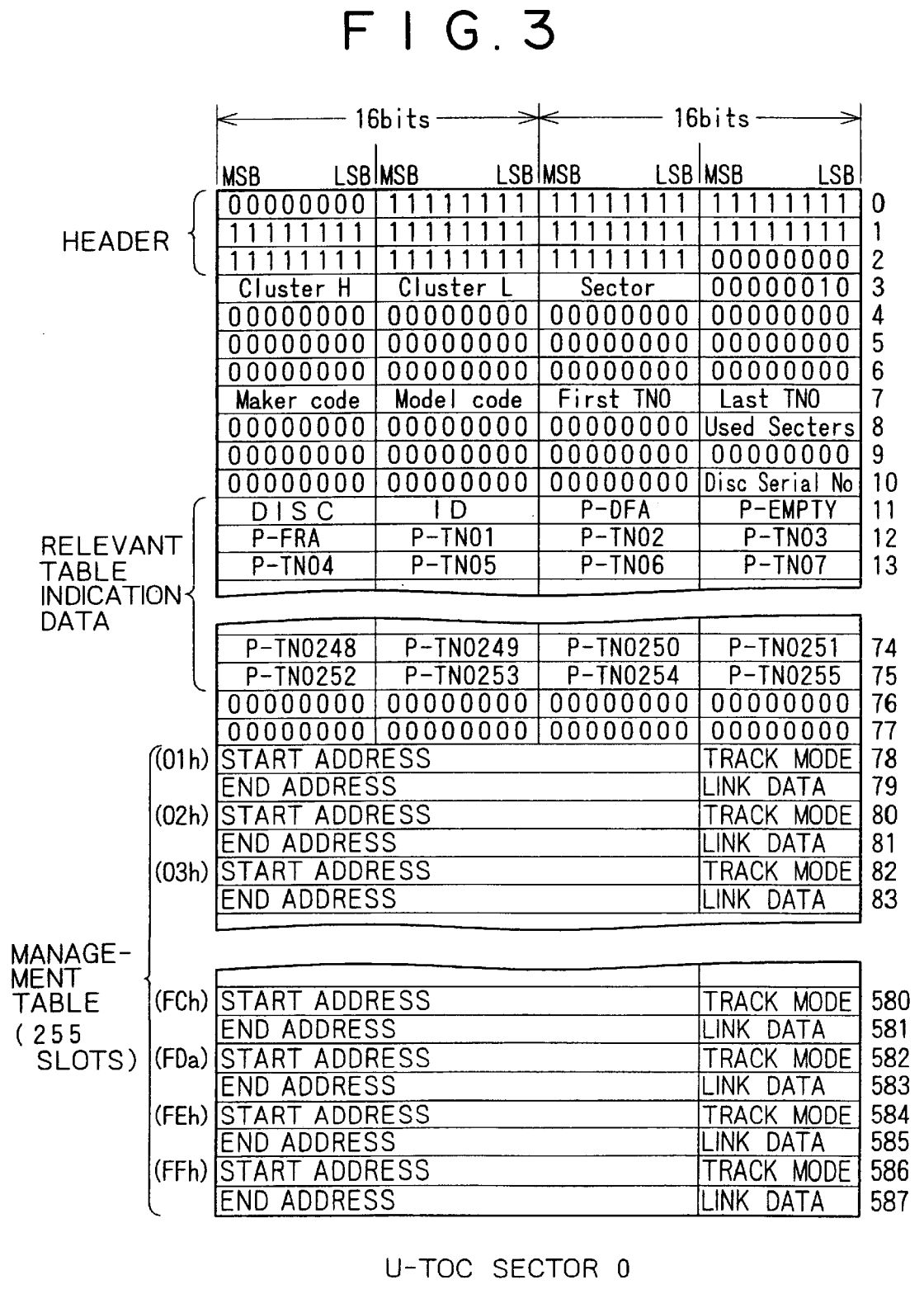

| | | 16bits MSB LSB | MSB LSB | 16bits MSB LSB | MSB LSB | |
|---|---|---|---|---|---|---|
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | Cluster H | Cluster L | Sector | 00000010 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Secters | 8 |
| | | 00000000 | 00000000 | 00000000 | 00000000 | 9 |
| | | 00000000 | 00000000 | 00000000 | Disc Serial No | 10 |
| RELEVANT TABLE INDICATION DATA | | DISC | ID | P-DFA | P-EMPTY | 11 |
| | | P-FRA | P-TN01 | P-TN02 | P-TN03 | 12 |
| | | P-TN04 | P-TN05 | P-TN06 | P-TN07 | 13 |
| | | P-TN0248 | P-TN0249 | P-TN0250 | P-TN0251 | 74 |
| | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| MANAGE-MENT TABLE (255 SLOTS) | (01h) | START ADDRESS | | | TRACK MODE | 78 |
| | | END ADDRESS | | | LINK DATA | 79 |
| | (02h) | START ADDRESS | | | TRACK MODE | 80 |
| | | END ADDRESS | | | LINK DATA | 81 |
| | (03h) | START ADDRESS | | | TRACK MODE | 82 |
| | | END ADDRESS | | | LINK DATA | 83 |
| | (FCh) | START ADDRESS | | | TRACK MODE | 580 |
| | | END ADDRESS | | | LINK DATA | 581 |
| | (FDa) | START ADDRESS | | | TRACK MODE | 582 |
| | | END ADDRESS | | | LINK DATA | 583 |
| | (FEh) | START ADDRESS | | | TRACK MODE | 584 |
| | | END ADDRESS | | | LINK DATA | 585 |
| | (FFh) | START ADDRESS | | | TRACK MODE | 586 |
| | | END ADDRESS | | | LINK DATA | 587 |

U-TOC SECTOR 0

FIG. 5

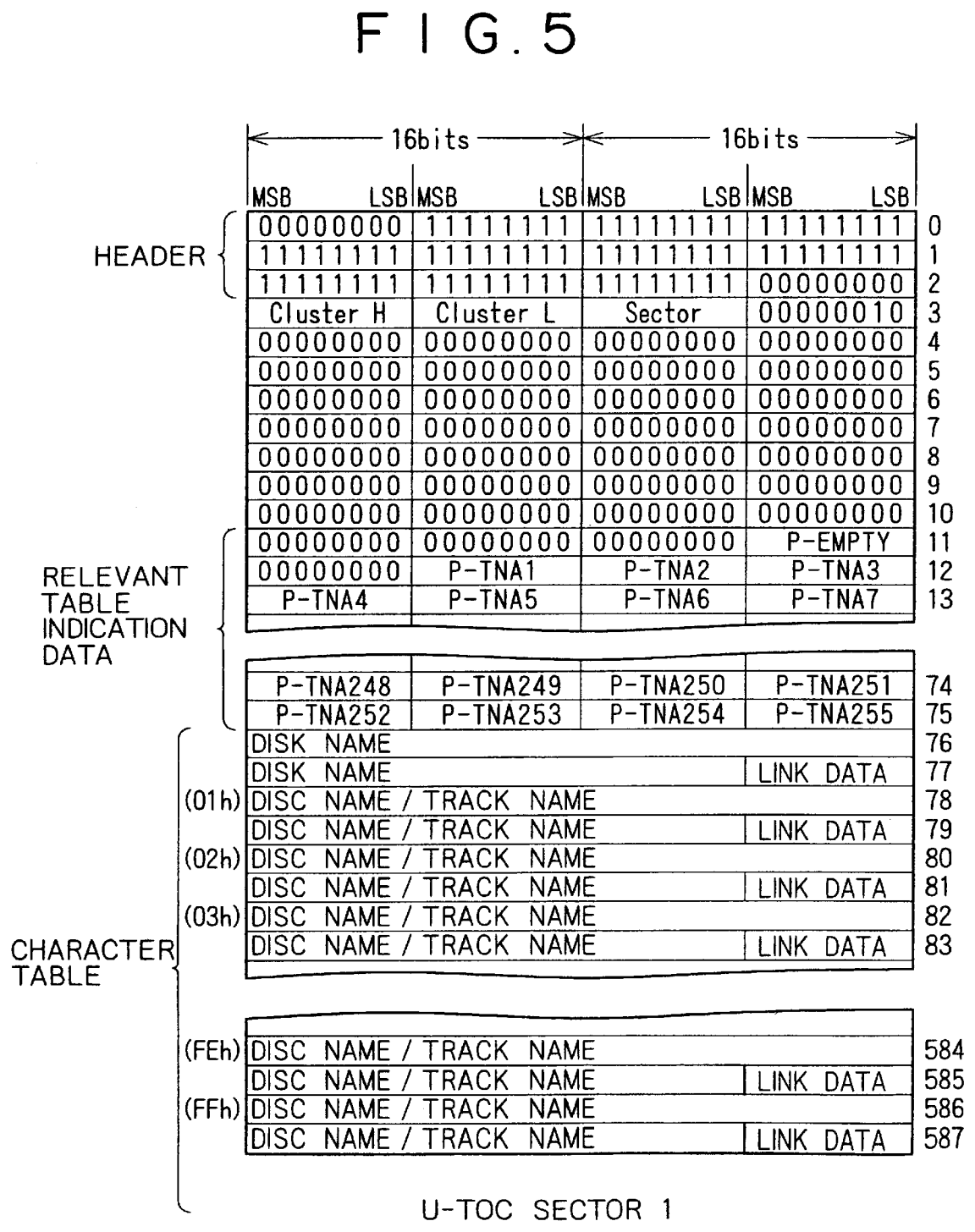

| | 16bits MSB LSB | MSB LSB | 16bits MSB LSB | MSB LSB | |
|---|---|---|---|---|---|
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| RELEVANT TABLE INDICATION DATA | 00000000 | 00000000 | 00000000 | P-EMPTY | 11 |
| | 00000000 | P-TNA1 | P-TNA2 | P-TNA3 | 12 |
| | P-TNA4 | P-TNA5 | P-TNA6 | P-TNA7 | 13 |
| | P-TNA248 | P-TNA249 | P-TNA250 | P-TNA251 | 74 |
| | P-TNA252 | P-TNA253 | P-TNA254 | P-TNA255 | 75 |
| CHARACTER TABLE | DISK NAME | | | | 76 |
| | DISK NAME | | | LINK DATA | 77 |
| (01h) | DISC NAME / TRACK NAME | | | | 78 |
| | DISC NAME / TRACK NAME | | | LINK DATA | 79 |
| (02h) | DISC NAME / TRACK NAME | | | | 80 |
| | DISC NAME / TRACK NAME | | | LINK DATA | 81 |
| (03h) | DISC NAME / TRACK NAME | | | | 82 |
| | DISC NAME / TRACK NAME | | | LINK DATA | 83 |
| (FEh) | DISC NAME / TRACK NAME | | | | 584 |
| | DISC NAME / TRACK NAME | | | LINK DATA | 585 |
| (FFh) | DISC NAME / TRACK NAME | | | | 586 |
| | DISC NAME / TRACK NAME | | | LINK DATA | 587 |

U-TOC SECTOR 1

DIGITAL INTERFACE FORMAT
FIG.6A
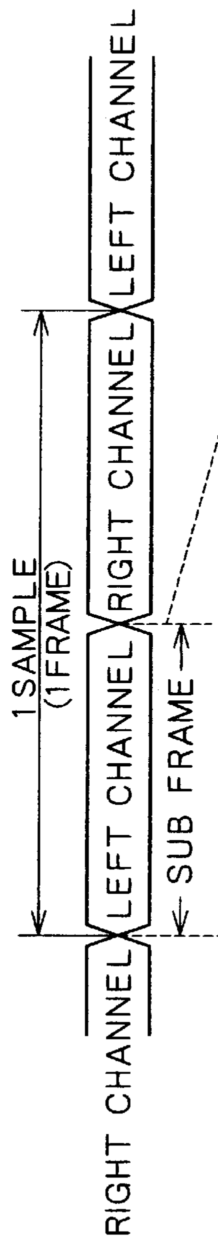
FIG.6B
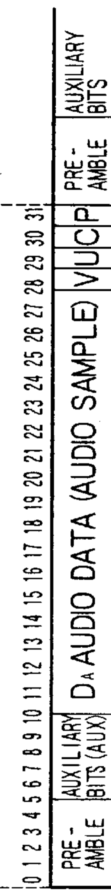
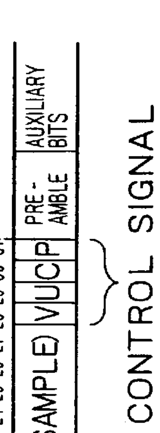
CONTROL SIGNAL
V: VALID FLAG
U: USER DATA
C: CHANNEL STATUS
P: PARITY BIT

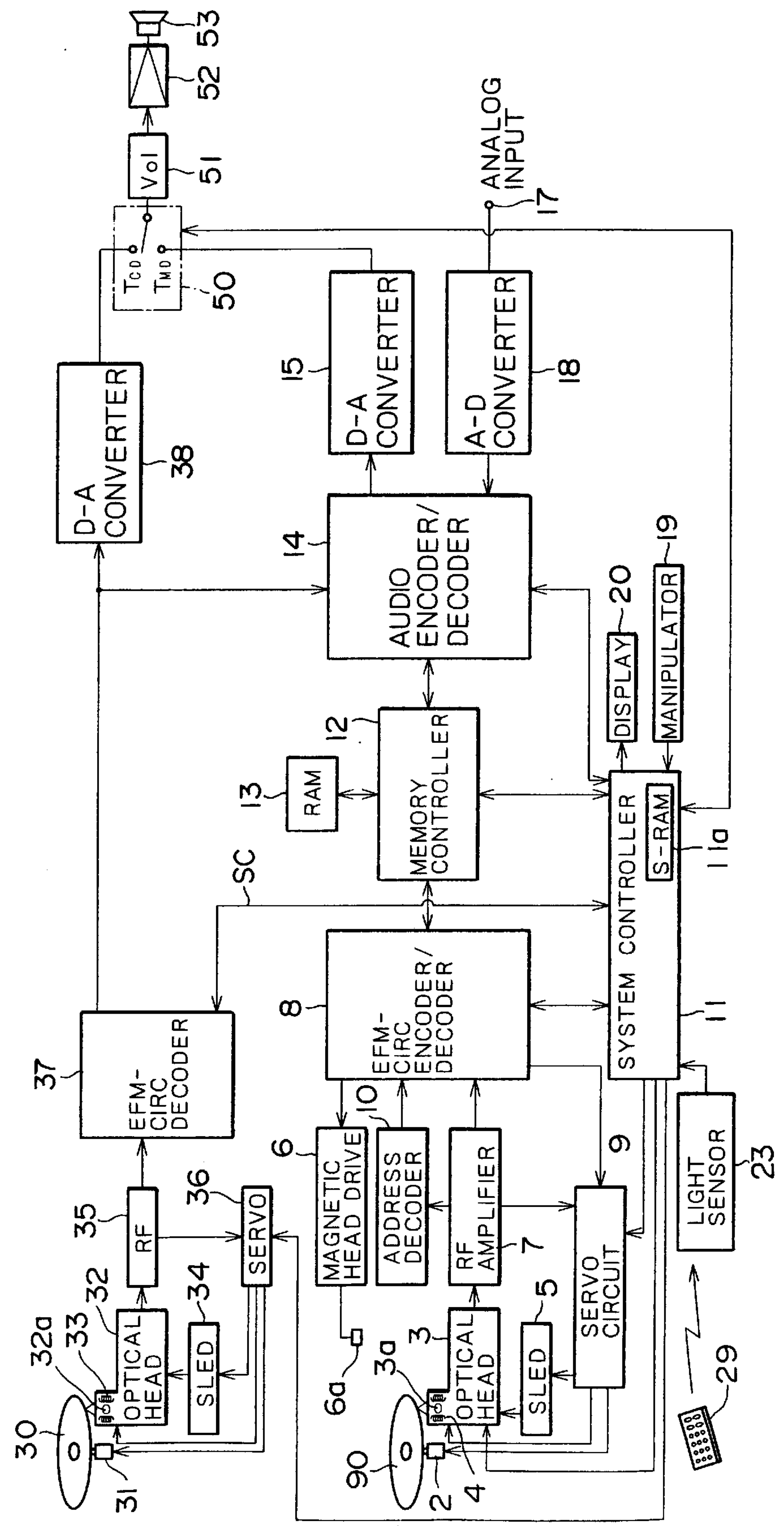
F I G. 8
D-A CONVERTER
D-A CONVERTER
A-D CONVERTER
ANALOG INPUT
Vol
TCD
TMD
AUDIO ENCODER/ DECODER
MEMORY CONTROLLER
RAM
EFM-CIRC DECODER
EFM-CIRC ENCODER/ DECODER
SYSTEM CONTROLLER
S-RAM
DISPLAY
MANIPULATOR
RF
SERVO
OPTICAL HEAD
SLED
MAGNETIC HEAD DRIVE
ADDRESS DECODER
RF AMPLIFIER
SERVO CIRCUIT
LIGHT SENSOR
SC
53
52
51
50
17
15
18
38
14
12
13
20
19
11a
11
37
8
10
6
9
35
36
32
34
32a
33
30
31
6a
3a
3
5
7
90
2
4
23
29

RECORDING APPARATUS, RECORDING METHOD, AND DUBBING APPARATUS FOR RECORDING OR DUBBING PROGRAMS AND CHARACTER DATA

BACKGROUND OF THE INVENTION

The present invention relates to a recording apparatus, a recording method and a dubbing apparatus adapted for a recording medium where character data relative to programs such as audio data are also recorded together with the programs.

There are known heretofore apparatus for recording and/or reproducing audio data on and/or from a magneto-optical disc represented typically by a mini disc (MD).

On such a magneto-optical disc, there are formed a program area for recording audio data and a management area for recording table information (U-TOC: user table of contents) to manage the programs recorded in the program area.

In an MD disc system and so forth, "program" is generally termed "track" also, and audio data composed of each musical piece for example is managed as a unit program.

In a recording apparatus, inputting a title of each program is performed by a user through manipulation of a key or a jog dial provided on the casing of such a recording apparatus or an alphabet key provided on a remote controller.

For example, it is possible for the user to manipulate an alphabet key on a remote controller while dubbing audio data in a magneto-optical disc and to input characters corresponding to the program being dubbed.

In such a character input mode, a title of the relevant program being dubbed is inputted. In this case, however, there may arise a problem that the user fails to perform proper input depending on the number of characters of the input title, the kind of characters (alphabet, Kanji, Katakana, Hiragana, etc.), or playing time information of the program being dubbed.

Suppose now that the user inputs a title of each musical piece while dubbing, on an MD (mini disc), programs of musical pieces recorded on a CD (compact disc).

In this case, the user performs an operation of inputting characters while reading, during or after the dubbing, the program name or album title described on a words card or a liner note attached to the CD.

In this character input mode, the title of the musical piece being currently played (or recorded) can be inputted, but upon advance to the next musical piece, the character input mode relative to the musical piece of that title being inputted is ended, and the operation proceeds to a next-program character input mode.

Therefore, with regard to any musical piece whose playing time is merely several seconds, it is impossible to take a sufficient time for inputting a title composed of a large number of characters (a title having many spellings) or a title composed of different kinds of characters such as alphabets and numerals combintion. Consequently, the operation proceeds to a next-program character input mode during the input of the current title, so that the characters are inputted in an incomplete halfway manner.

Particularly in the above character input mode where different kinds of characters are coexistent, a relatively long time is required since an additional manipulation of switching character kind modes is needed for changing the kinds of characters.

In case the entire characters of a title fail to be inputted completely by the time of termination of playing the relevant musical piece whose title is to be inputted, it has been necessary heretofore to edit the titles after completion of dubbing the entire musical pieces.

For example, when characters of any musical piece being reproduced are inputted while such reproduction is continuously performed, the character input can be executed in a reproduction pause mode regardless of the playing time, but there exists a particular disadvantage that pause control is impossible during a recording operation.

SUMMARY OF THE INVENTION

It is therefore an object of the present invention to provide a recording apparatus, a recording method and a dubbing apparatus which are capable of achieving input of titles without depending on any change of program numbers during dubbing (or reproduction).

According to a first aspect of the present invention, there is provided an apparatus for recording programs and program names on a recording medium having a program area to record the programs and a management area to manage the positions of the recorded programs in the program area and also to manage the program names. This apparatus comprises a character input means for inputting the program names;

a settle input manipulation means for settling the program name of one unit inputted by the character input means;

a partition code generation means for generating a partition code in response to a manipulation of the settle input manipulation means;

a storage means for storing the program name after attaching a partition code generated by the partition code generation means to a character string which represents the program name of one unit inputted by the character input means;

and a control means for extracting, from the character strings stored in the storage means, the program name corresponding to the relevant program with reference to the partition code, and updating the data in the management area of the recording medium.

According to a second aspect of the present invention, there is provided a method of recording programs and program names on a recording medium having a program area to record the programs and a management area to manage the positions of the recorded programs in the program area and also to manage the program names. This recording method comprises steps of storing character data in response to a manipulation for inputting the character data representative of a program name;

attaching a partition code to a character string of the character data in response to a manipulation for settling the program name of one unit;

and extracting the character data of the relevant program with reference to the partition code after completion of the foregoing character data storing step and partition code attaching step executed once or plural times, and then updating the data in the management area of the recording medium.

And according to a third aspect of the present invention, there is provided a dubbing apparatus which comprises a reproducing means for reading and reproducing a program recorded on a first recording medium;

a recording means for recording the reproduced program on a second recording medium having at least a program area to record programs and a management area to manage the positions of the programs recorded in the program area and also to manage the program names;

a character input means for inputting character data representative of the program name;

a settle input manipulation means for settling the program name of one unit inputted by the character input means;

a partition code generation means for generating a partition code in response to a manipulation of the settle input manipulation means;

a storage means for storing the program name as a character string after attaching a partition code generated by the partition code generation means to the program name inputted by the character input means;

and a control means for extracting, from the character strings stored in the storage means, the character data corresponding to the relevant recorded program in the second recording medium with reference to the partition code, and then updating the data in the management area of the second recording medium.

Thus, in the present invention, input character data are partitioned per settled data and are recorded as information to manage the recording medium, so that a manipulation for inputting a desired program name can be executed regardless of recording, reproduction or any operation mode of the apparatus. Consequently, it becomes possible to continue input of program names without being affected by any change of the program being currently played in a recording or reproduction mode, hence eliminating the known disadvantage that the character input data are interrupted halfway and re-input thereof is needed over again after completion of the recording or reproduction.

The above and other features and advantages of the present invention will become apparent from the following description which will be given with reference to the illustrative accompanying drawings.

BRIEF DESCRIPTION OF THE DRAWINGS

FIG. 1 is a block diagram of an MD (mini disc) recorder in a first embodiment of the present invention;

FIG. 3 is an explanatory diagram showing U-TOC sector 0 in the MD system;

FIG. 5 is an explanatory diagram showing U-TOC sector 1 in the MD system;

FIGS. 6A and 6B are explanatory diagrams is an explanatory diagram showing a digital audio interface format;

FIG. 8 is a block diagram of a CD-MD composite apparatus in a second embodiment of the present invention.

DESCRIPTION OF THE PREFERRED EMBODIMENTS

Figure 2:
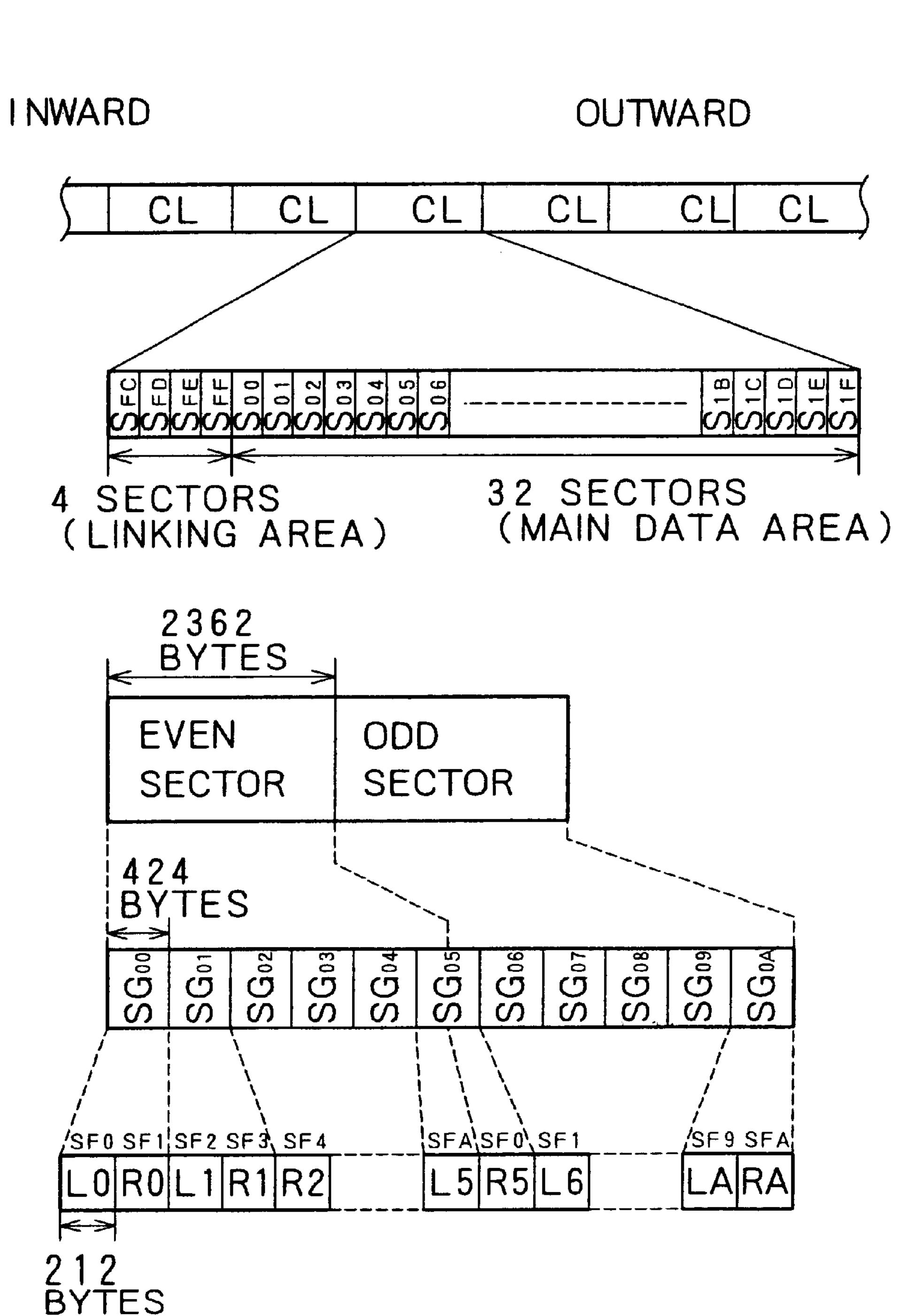
FIG. 2 is an explanatory diagram showing a cluster format in an MD system.

Hereinafter the present invention will be described in detail with reference to some preferred embodiments thereof. A first embodiment relates to a recording apparatus representing an MD recorder which is capable of performing a recording/reproducing operation with regard to a magneto-optical disc as an MD (mini disc).

The description will be given in the following order.

(First Embodiment]

1. Structure of MD recorder
2. Cluster format
3. U-TOC
4. Digital interface format
5. Character editing operation
6. Character editing process (Second Embodiment)

7. Structure of CD-MD recorder
8. Character editing process

1. Structure of MD Recorder

FIG. 1 is a block diagram of an MD recorder 1 in a first embodiment of the invention.

The MD recorder 1 is capable of recording audio data in and/or reproducing the same from a magneto-optical disc (MD) 90.

The magneto-optical disc 90 is housed in a cartridge, and a shutter mechanism provided in the cartridge is opened or closed in a recording mode or a reproduction mode, so that light outputted from an optical pickup (optical head 3) can be irradiated to the disc and also a magnetic field from a magnetic head can be applied thereto.

The magneto-optical disc 90 is driven by a spindle motor 2 under control to be rotated at a constant linear velocity (CLV).

The optical head 3 is disposed opposite to the magnetic head 6*a* with the loaded magneto-optical disc 90 interposed therebetween. The optical head 3 comprises an objective lens 3*a*, a biaxial mechanism 4, an unshown semiconductor laser for emitting light therefrom to the surface of the magneto-optical disc 90, and a light sensor which detects the reflected light from the disc surface.

The biaxial mechanism 4 has a focus coil for driving the objective lens 3*a* toward or away from the magneto-optical disc 90, and a tracking coil for driving the objective lens 3*a* in the radial direction of the magneto-optical disc 90.

The MD recorder 1 further comprises a sled mechanism 5 for widely moving the whole optical head 3 in the radial direction of the magneto-optical disc 90.

The reflected light data detected by the light sensor in the optical head 3 is supplied to an RF amplifier 7 and, after current-to-voltage conversion, the data is processed through matrix calculation to produce a focus error signal FE, a tracking error signal TE and an RF signal.

When the light is irradiated to the magneto-optical disc 90 with a laser power lower than that in a recording mode, the magnetic field vector is detected by utilizing the Kerr effect of the reflected light, and the reproduced RF signal is obtained on the basis of such detected magnetic field vector.

The focus error signal FE and the tracking error signal TE produced in the RF amplifier 7 are supplied to a servo circuit 9 for phase compensation circuit and gain adjustment, and then the signals FE and TE are applied via a drive amplifier (not shown) respectively to the focus coil and the tracking coil of the biaxial mechanism 4.

Further a sled error signal is produced, out of the tracking error signal TE, via a low pass filter (LPF) in the servo circuit 9, and then is applied via a sled drive amplifier (not shown) to the sled mechanism 5.

Subsequently the RF signal obtained from the RF amplifier 7 is supplied to an EFM-CIRC encoder/decoder 8, where the RF signal is binary-coded and then is processed through EFM (eight-to-fourteen modulation and demodulation) and CIRC (cross interleave Reed-Solomon coding) error correction, and thereafter the processed signal is supplied to a memory controller 12.

A groove is formed previously on the magneto-optical disc 90 in a meandering manner at a predetermined frequency (22.05 kHz in this example), and address data are recorded therein through frequency modulation.

The address data can be extracted through frequency demodulation in an address decoder 10 via a band pass filter (BPF) which passes only the predetermined frequency alone.

In the EFM-CIRC encoder/decoder 8, a spindle error signal is produced for controlling the rotation of the disc on the basis of the binary-coded EFM signal or the address data extracted in the address decoder 10, and then this spindle error signal is applied via the servo circuit 9 to the spindle motor 2.

Further in the EFM-CIRC encoder/decoder 8, a reproduction clock signal is generated, on the basis of the binary-coded EFM signal, for controlling the pull-in action of a PLL (phase locked loop) and executing a decoding process.

The binary-coded data after error correction are written in a buffer memory 13 by the memory controller 12 at a transfer rate of 1.4 Mbits/sec.

Upon storage of the data over a predetermined amount in the buffer memory 13, the data are read out therefrom by the memory controller 12 at a transfer rate of 0.3 Mbits/sec which is sufficiently lower than the write transfer rate, and then are outputted as audio data.

Thus, the data are once stored in the buffer memory 13 and then are outputted as audio data, so that even if continuous data reading by the optical head 3 is interrupted due to occurrence of an unnecessary track jump or the like derived from some disturbance such as shock, the audio output is still obtainable continuously since the data, which correspond to the time required for resetting the optical head 3 to the address of the track jump, are stored previously in the buffer memory 13.

In this embodiment, if a RAM of 4 Mbytes for example is employed as the buffer memory 13, audio data of approximately 10 seconds can be stored maximally in the buffer memory 13.

The memory controller 12 is under control of a system controller 11.

The data read from the magneto-optical disc 90 are those compressed in the recording mode by a predetermined method (e.g., by ATRAC (acoustic transferred adapted coding) in this embodiment). Therefore, the data read from the buffer memory 13 by the memory controller 12 are processed in an audio compression encoder/expansion decoder 14 where the compressed data are expanded, and then the expanded digital data thus obtained are supplied to a D-A converter 15.

In the D-A converter 15, the digital data expanded in the audio compression encoder/expansion decoder 14 are converted into analog audio signal. Subsequently the analog audio signal is supplied from an output terminal 16 to an unshown reproduction output system (including amplifiers, speakers, headphones, etc.), from which stereo audio signals of left and right channels are outputted.

In this reproduction mode, the system controller 11 performs various control actions for transferring a servo command to the servo circuit 9 in response to each manipulation of a manipulator 19, or giving an instruction to the memory controller 12 to control the buffer memory 13, or controlling a display unit 20 to execute display of character data inclusive of an elapsed playing time, a title of the program being reproduced, or executing spindle servo control or decode control in the EFM-CIRC encoder/decoder 8.

A remote commander 29 is prepared for the user to perform a desired manipulation with the manipulator 19, and a command corresponding to a manipulation by the user is outputted as an infrared modulation signal for example from the remote commander 29. The command representing the information of the manipulation is first converted into an electric signal by an infrared sensor 23 and then is supplied to the system controller 11. Subsequently the system controller 11 executes a necessary control action in response also to the signal from the infrared sensor 23.

When an audio signal of a musical piece or the like is to be recorded on the magneto-optical disc 90 in this MD recorder 1, the audio signal is supplied to either an input terminal 17 or an input terminal 21.

An analog audio signal delivered from an analog output terminal of a reproducing apparatus such as a CD player is applied to the input terminal 17 and then is converted into a digital signal by an A-D converter 18, and the converted signal is supplied to the audio compression encoder/expansion decoder 14. This is a recording signal input path in analog dubbing.

Meanwhile, a digital audio signal transmitted in digital data form from a digital output terminal of a reproducing apparatus such as a CD player is applied to the input terminal 21. In this case, decoding relative to the digital communication format, extraction of the control data and so forth are performed in a digital interface 25, and then the digital audio signal is supplied to the audio compression encoder/expansion decoder 14. This is a recording signal input path in digital dubbing.

The digital audio signal inputted to the audio compression encoder/expansion decoder 14 is encoded through compression by ATRAC (acoustic transferred adapted coding), and the compressed digital audio signal is once stored in the buffer memory 13 via the memory controller 12 at a transfer rate of 0.3 Mbits/sec.

Upon detection of that the compressed data stored in the buffer memory 13 have reached a predetermined amount, the memory controller 12 permits reading of the data from the buffer memory 13.

The compressed data thus read out from the buffer memory 13 are supplied to the EFM-CIRC encoder/decoder 8, where processes of attaching a CIRC error correction code and EFM modulation are executed, and then the data thus processed are applied to the magnetic head drive circuit 6.

The magnetic head drive circuit 6 serves to drive the magnetic head **6*a*** by applying a magnetic field to the N-pole or S-pole thereof in accordance with the supplied data.

In the recording mode where such magnetic field application is executed, the system controller 11 controls the outgoing power of an unshown semiconductor laser in the optical head 3 to a value higher than the power in the reproduction mode, thereby heating the surface of the magneto-optical disc up to its Curie temperature. Consequently, the magnetic field information applied from the magnetic head **6*a*** is fixed on the recording plane of the disc. That is, the data is recorded as magnetic field information.

Further in the recording mode, the system controller 11 performs control actions for transferring various servo commands to the servo circuit 9, or giving an instruction to the memory controller 12 to control the buffer memory 13, or controlling the display unit 20 to execute display of data inclusive of an elapsed recording time and the track number of the program being recorded, or executing spindle servo control or encode control in the EFM-CIRC encoder/decoder 8.

In a process relative to the digital data input, the system controller 11 takes in the extracted control data from a digital interface 25.

Meanwhile in a process relative to the analog signal input, the analog audio signal from the input terminal 17 is supplied also to a silence detector 22 so that a no-sound silent state between programs of the input audio signal is monitored. And then the monitor information thus obtained is supplied to the system controller 11.

In this MD recorder 1, it is possible to record character data, in addition to the audio data, on the magneto-optical disc 90, such as those representing the whole disc and each program (musical piece, track) of the audio data.

For enabling the user to input such character data, there is provided a manipulator 19 which comprises, for example, a character selector with a mode key and a jog dial 19*a* for starting and ending a character input mode and for acting as a key for determining an input character string and to settle the same with regard to the relevant program as described below.

Further a remote commander or control 29 is provided for enabling the user to input character data therefrom as well. This remote commander 29 has keys shown generally as 29*a* that include standard alphabet keys "A"–"Z", symbol keys including "·", ",", ".", " " and "?", and so-called ten keys for inputting numerals. As will be described layer, one symbol key, such as "^" or the like may be provided as a title settle key in place of or together with an enter key which is one of the keys 29*a*.

The system controller 11 holds, in its internal S-RAM 11*a*, the characters inputted from the manipulator 19 or the remote commander 29 and, upon determination of the character string by a relevant manipulation, registers such character string in a state corresponding to the selected program.

The selected program signifies the one placed in a reproduction, recording or pause mode at that time. In any other mode where no program is being selected, the input character string is handled as character data for the whole disc.

The registered character data written on the disc 90 as data of undermentioned U-TOC sector 1 which will be described later, whereby the data is settled on the disc 90. Updating the U-TOC data on the disc 90 is executed at predetermined timing after completion of a recording operation or a character input operation, or at ejection of the magneto-optical disc.

2. Cluster Format

Now an explanation will be given on a cluster format of a recording data track on the magneto-optical disc 90.

The recording operation in the MD system is performed per cluster as a unit. FIG. 2 shows a format of such a cluster.

In the MD system, a recording track is composed of clusters CL which are formed continuously as shown in FIG. 2, wherein each cluster is a minimum unit in recording. One cluster corresponds to a few rounds of the track.

Each cluster CL has a 4-sector sub data area of sectors SFC–SFF and a 32-sector main data area of sectors S00–S1F. Main data for audio use are compressed through the aforementioned ATRAC process to become audio data.

Each sector is a unit of data composed of 2352 bytes.

The 4-sector sub data area is used as a linking area for recording sub data, and the 32-sector main data area is used for recording TOC data, audio data and so forth.

Since the CIRC interleave length adopted herein is greater than a sector length (13.3 msec) adopted for error correction in a CD or the like, the sectors in the linking area are formed as waste sectors for adjustment of the length, and fundamentally the linking area serves as a reserve area. However, these sectors are usable for some other process or for recording some control data.

An address is recorded per sector.

The sectors are further fractionized into smaller units of sound groups, and 2 sectors are divided into 11 sound groups.

More specifically, as shown in FIG. 2, sound groups SG00–SG0A are included in two successive sectors such as an even-numbered sector S00 and an odd-numbered sector S01. Each sound group is composed of 424 bytes, and the amount of its audio data corresponds to a time of 11.61 msec.

In each sound group SG, data of a left channel and a right channel are recorded separately. For example, sound group SG00 contains left-channel data L0 and right-channel data R0, and sound group SG01 contains left-channel data L1 and right-channel data R1.

A left-channel or right-channel data area of 212 bytes is termed a sound frame.

3. U-TOC

The cluster format of FIG. 2 is formed over the entire area of the magneto-optical disc 90, wherein an innermost peripheral one of radially divided areas is used as a management area, and a program area is formed continuously with the management area.

In the innermost periphery of the disc, there is provided a reproduction-only area for recording reproduction-only data with phase pits, and a magneto-optical area adapted for magneto-optical recording and reproduction is formed continuously with the reproduction-only area. The management area consists of the reproduction-only area and the innermost periphery of the magneto-optical area.

In the program area formed continuously with the management area in the magneto-optical area, audio data is recorded in each sector of the main data area in FIG. 2.

In the management area, P-TOC (premastered TOC) for managing the areas of the whole disc is provided in the reproduction-only area, and U-TOC (user table of contents) for managing the programs (musical pieces, etc.) recorded in the program area is recorded in the management area included in the magneto-optical area continuous with the reproduction-only area.

In executing the recording or reproduction mode on the magneto-optical disc 90, it is necessary to read out the management data, i.e., P-TOC and U-TOC recorded on the magneto-optical disc 90. The system controller 11 discriminates, in accordance with such management data, the address of the area for recording on the magneto-optical disc 90 or the address of the area for reproduction thereon. The management data are held in the buffer memory 13. For this purpose, the buffer memory 13 is divided into a buffer area for storing the data to be recorded and the data to be reproduced, and an area for holding such management data.

The system controller 11 reads out the management data, when the magneto-optical disc 90 has been loaded, by reproducing the innermost periphery of the disc where the management data are recorded, and then stores the management data in the buffer memory 13, thereby enabling reference to such data in execution of the recording and/or reproduction mode on the disc.

The U-TOC is rewritable by recording or erasure of the data and also by an editing manipulation such as input of character data. In response to every recording, erasing or editing operation, the system controller 11 updates the U-TOC data stored in the buffer memory 13, and further rewrites the U-TOC area of the magneto-optical disc 90 at predetermined timing in response to such updating also.

In processing the management data, the system controller 11 is further capable of loading the P-TOC and U-TOC either partially or entirely from the buffer memory 13 to its internal S-RAM 11*a*, and executing a required process with regard to the management data in the S-RAM 11*a*.

For example, in a character input mode which will be described later, the data in the S-RAM 11*a* are updated sequentially in response to a series of character input manipulations, and the U-TOC data in the buffer memory 13 are rewritten upon completion of such manipulations (i.e., when the entire updated U-TOC data have been settled with regard to the character input). And further at the time of ejecting the disc or turning off the power supply, the U-TOC data on the disc are rewritten by the U-TOC data in the buffer memory 13.

Hereinafter an explanation will be given on U-TOC sectors used as management data for managing recording and reproduction of tracks (musical pieces, etc.) on the magneto-optical disc 90.

FIG. 3 shows a format of U-TOC sector 0.

A maximum of sectors 0 to 31 can be formed as U-TOC sectors. That is, sectors (S00–S1F) of a cluster in the management area are usable. Sector 1 and sector 4 are used for recording character data, while sector 2 is an area for recording a date and a time.

U-TOC sector 0 is used as a data area to record management data relative principally to musical pieces recorded by the user or to a free area for newly recording musical pieces. More specifically, in this sector 0, there are managed start addresses and end addresses of the programs recorded in the program area, and also copy protect data and emphasis data as track modes of the programs.

For example, in recording a certain musical piece on the magneto-optical disk 90, the system controller 11 detects the free area on the disc from U-TOC sector 0 and then records audio data therein. And in a reproduction mode, the system controller 11 detects the area, where the musical piece to be reproduced is recorded, from U-TOC sector 0 and then performs reproduction thereof by accessing the relevant area.

In U-TOC sector 0, as shown in FIG. 3, there are successively recorded a header where a 12-byte sync pattern is formed, 3-byte data ("Cluster H", "Cluster L", "Sector") as an address of this sector, a maker code and a model code representing the manufacturer of the disc, a first program number ("First TNO"), a last program number ("Last TNO"), state of used sectors ("used sectors"), disc serial number ("disc serial No"), and disc ID.

And there is further recorded a region of corresponding-table indication data which includes a pointer P-DFA (pointer for detective area) indicating the top position of a slot to store information of a defective position caused on the magneto-optical disc 90, a pointer P-EMPTY (pointer for empty slot) indicating the state of use of slots, a pointer P-FRA (pointer for freely recordable area) indicating the top position of a slot to manage the freely recordable area, and pointers P-TNO1, P-TNO2, . . . , P-TNO255 each indicating the top position of the slot corresponding to the relevant program number.

In succession, there is also formed a management table having 255 slots each composed of 8 bytes. Each slot is used for managing a start address, an end address, a track mode and link data.

The magneto-optical disc 90 in this embodiment is so contrived that data need not exactly be recorded in a continuous form on the recording medium, and sequential data sets may be recorded discretely (as a plurality of parts) on the recording medium. (In this case, parts denote portions where temporally continuous data are recorded in physically continuous clusters.)

More specifically, in the recording/reproducing apparatus (MD recorder 1 of FIG. 1) adapted for the magneto-optical disc 90, data are once stored in the buffer memory 13 as described, and the data write rate to the buffer memory 13 is made different from the data read rate. Since the data are stored in the buffer memory 13 while the optical head 3 is driven to sequentially access the data recorded discretely on the disc 90, the sequential data sets can be reproduced properly on the buffer memory 13.

In the structure mentioned above, the write rate to the buffer memory 13 in a reproduction mode is set to be higher than the read rate, whereby continuous audio reproduction is never impeded.

Further, even if any program shorter than the recorded program is written over the recorded program, the remaining portion can be designated as a freely recordable area (area managed by pointer P-FRA) without being erased, hence realizing efficient use of the recording capacity.

Figure 4:
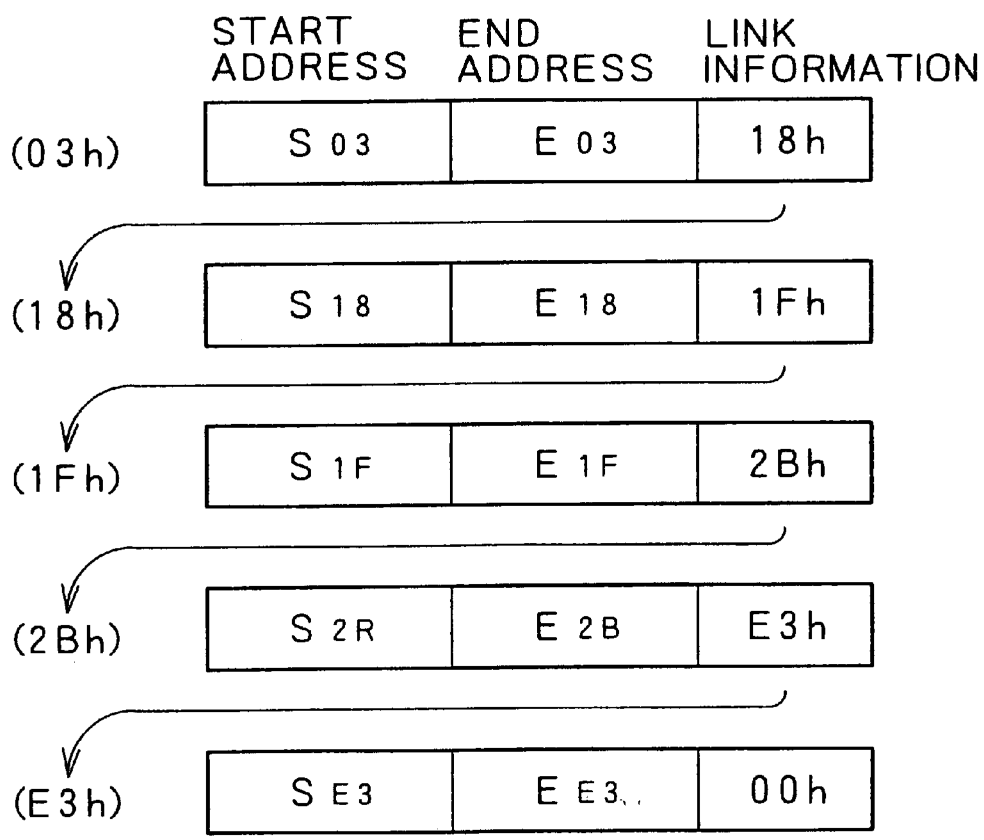
FIG. 4 is an explanatory diagram showing a link state of U-TOC sector 0 in the MD system.

Referring now to FIG. 4, an explanation will be given on a method of coupling discretely existent areas by the use of an example of pointer P-FRA for managing the freely recordable area.

Assuming that a value 03h (hexadecimal) is recorded as pointer P-FRA which indicates the top position of a slot to manage the freely recordable area, then the slot corresponding to "03h" is accessed. That is, the data of slot 03h in the management table is loaded.

The start address data and the end address data recorded in slot 03h indicate, respectively, the start point and the end point of one part recorded on the disc.

The link data recorded in slot 03h indicates the address of the next slot to follow. In this case, 18h is recorded.

Subsequently, slot 2Bh is accessed by tracing the link data recorded in slot 03h, and the start point and the end point of one part on the disc are grasped respectively as the start address and the end address recorded in slot 2Bh.

Similarly to the above, the addresses of the entire parts managed by pointer P-FRA can be grasped by tracing the link data successively until "00h" is obtained as link data.

In this manner, slots are traced until the link data becomes null (=00h) from the start point of the slot indicated by pointer P-FRA, so that the parts recorded discretely on the disc can be linked on the memory. In this case, it is possible to grasp the entire parts as a freely recordable area on the disc 90.

Although pointer P-FRA has been explained in this example, each of the other pointers P-FRA, P-EMPTY, P-TNO1, P-TNO2, . . . , P-TNO255 also serves to link and manage the parts existent discretely on the disc.

Next, FIG. 5 shows a format of U-TOC sector 1.

In U-TOC sector 1, there are managed character data (e.g., track names) relative to the individual programs recorded in the program area, and other character data (e.g., disc title) relative to the whole magneto-optical disc 90.

When the recorded programs are audio data, the disc title represents information inclusive of an album title and a performer's name, and the character data relative to each program represents a track name of the corresponding musical piece for example. Such character data are registered by a user who sets desired characters and inputs the same.

The character data per program is recorded in a slot within the character table indicated by a character slot indication pointer P-TNA(x) (where x is a numerical value of 1 to 255). Character data of 7 bytes can be recorded in a single slot, and when the characters to be recorded are many in number, the character data may be recorded in a plurality of slots linked by the use of link data.

Regarding U-TOC sector 2, the recording date and time for each program recorded in its program area are managed in the same manner as the above.

Further regarding U-TOC sector 4, similar management is executed in the same manner as in FIG. 5 so that Katakana and Kanji can be used as fonts for the character data which represent the titles of the individual programs recorded in its program area and the title of the whole magneto-optical disc.

4. Digital Interface Format

Referring now to FIGS. 6A and 6B, an explanation will be given on a data format transmitted from the decoder 37 to the audio encoder/decoder 14 in digital dubbing executed from the compact disc 30 to the magneto-optical disc 90.

According to this data format, as shown in FIG. 6A, one frame consists of a fundamental unit sample obtained at a predetermined sampling frequency, and each frame is formed of a pair of sub frames composed of left-channel audio data and right-channel audio data.

As shown in FIG. 6B, each sub frame is composed of data of 32 bits for example. First 4 bits are used as a preamble for synchronization and identification of the sub frame. Next 4 bits are used as auxiliary ones (AUX), and succeeding 20 bits are used for digital audio data which are main data. And 4 bits following such digital audio data are used for control data composed of V bit, U bit, C bit and P bit for example.

The V bit serves as a valid flag. When this V bit is "0", it signifies that the data of the relevant sub frame is valid. Meanwhile, if the V bit is "1", it signifies that the data of the relevant sub frame is invalid. That is, on the receiving MD side, the data transmitted from the CD side is discriminated to be valid or invalid depending on the V bit.

The U bit serves as user data, and a sub code is generated by collecting average 1176 U bits included in the sub frame data (i.e., by extracting the U bits included in 1176 sub frames). The sub code thus generated is in the same form as that of the sub code recorded in the TOC area on the compact disc. Therefore, information inclusive of track numbers and so forth is also transmitted.

The C bit serves as channel status data, and a frame thereof is generated by collecting 192 U bits included in the sub frame data (i.e., by extracting the C bits included in 192 sub frames).

The channel status data are used for managing an identifier to discriminate between home use and business use of the transmitter (on the reproducing apparatus side), an identifier for protection of copyright, presence or absence of emphasis, generation information indicative of the number of times of dubbing, a category code of the transmitter (on the reproducing apparatus side) as an identifier signifying the category of the transmitter, channel data, and sampling frequency information.

And the P bit serves as a parity bit. Even parity is adopted in this system, and it is used for error detection corresponding to the sub frame data.

5. Character Input Operation

Hereinafter an explanation will be given on an exemplary operation of inputting titles or track names of programs to be digitally dubbed via the digital interface 25 from a CD player connected to the input terminal 21 of the MD recorder 1. It is assumed in this example that the CD to be reproduced in the CD player contains a total of five (first to fifth) recorded programs titled "abc", "def", "ghi", "jkl" and "mno" respectively, and these five programs are reproduced and dubbed in the MD player.

Although an operation of dubbing the programs themselves will not be described in detail here, since the data are transmitted in the aforementioned digital interface format, the system controller 11 is capable of accurately recognizing each blank between programs (change of track number) on the basis of the audio data from the CD, hence enabling execution of a proper recording process. For example, when dubbing five programs, it is possible to manage, according to U-TOC sector 0, the recorded audio data in a state divided exactly into five programs on the magneto-optical disc 90 (MD side) also.

For example, if the user selects a character input mode when the MD recorder is in its recording state after start of dubbing, the operation proceeds to the character input mode, and then a desired process (input of program title) is executed in response to a manipulation of the jog dial provided as part of manipulator 19 of the MD recorder or a manipulation of an appropriate one of the character input keys 29*a* provided as part of the remote controller.

In this case, an input character string is displayed on the display device 20 at each time.

For example, first a character string "abc" is inputted as the title of the first program, and then a title settle key is pressed or the jog dial is operated to settle the input character string.

Figure 7:
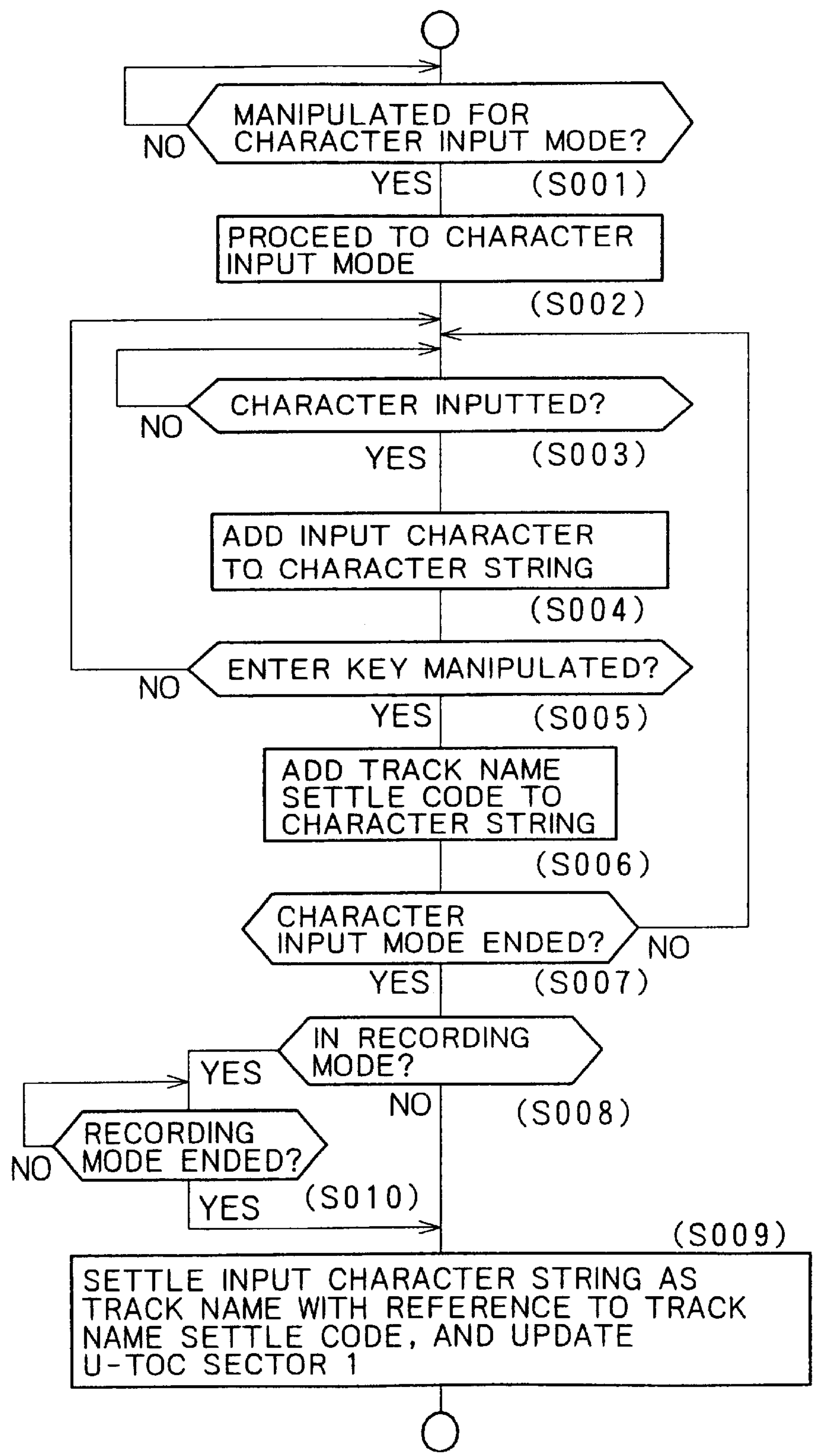
FIG. 7 is a flowchart for explaining a character input mode in the embodiment.

A code "^" is generated and automatically added to the title name character string as disclosed relative to the description of step S006 of FIG. 7 in response to the title settle key being pressed or the jog dial being operated, whereby a character string "abc^" is provided to system controller 11 to be stored in the S-RAM 11*a*. In this case, "^" does not need to be displayed on the display device 20, and merely "abc" alone is displayed.

The title settle code may be composed of any sign or symbol if it is generally not used as a part of a program title, like "^" in this example.

A predetermined manipulation in this case is executed by, for example, inputting "abc" as described, then rotating the jog dial 19*a* to display "^", and pressing the jog dial itself. In the case of using any character input key provided in the remote controller or the like, an enter key among keys 29*a* is pressed after manipulating the "^" key. And upon completion of inputting the title of the first program, the titles of the second to fifth programs are stored in the S-RAM 11*a* sequentially as "def^", "ghi^", "jkl^" and "mno" in the same manner as the above.

In the S-RAM 11*a*, the titles of the programs are stored as character strings of "abc^def^ghi^jkl^mno^" where the titles are partitioned or marked off by "^".

And upon completion of inputting the characters relative to the entire programs, the user executes a manipulation to terminate the character input mode, and in response to this manipulation, the system controller 11 terminates the character input mode.

After the dubbing for example is completed, the character strings stored in the S-RAM 11*a* are read out therefrom, and the character strings "abc", "def", "ghi", "jkl" and "mno" partitioned or marked off by "^" are recorded as titles corresponding respectively to the first to fifth programs dubbed on the magneto-optical disc 90.

6. Character Editing Process

Next, the processing operation of the system controller 11 in the character input mode will be explained below with reference to a flowchart of FIG. 7.

Upon detection of the user's manipulation to select the character input mode (S001), the operation proceeds to the character input mode (S002). In this mode, the system controller 11 waits for a manipulation of the jog dial or the like executed to input a character. And in response to detection of such a character input manipulation (S003), the input character is added to the character string to be stored in the S-RAM 11*a*(S004). Upon detection of any input from an enter manipulation (S005), a title settle code (e.g., "^") is added to the character string (S006). Meanwhile, if no input is detected from an enter manipulation, the system controller 11 waits for input by a character input manipulation at step S003. More specifically, in case steps S003–S005 are looped, it signifies that a character input manipulation for the title of the same program is executed. As described, the enter manipulation at step S005 corresponds to a manipulation of the enter key or that of the "^" key (or input of "^" by the jog dial).

After the title settle code is added to the character string at step S006, a decision is made as to whether a manipulation for ending the character input mode has been executed or not (S007). And if the end of the character input mode is not detected, the system controller 11 waits for a character input manipulation at step S003.

That is, the title of one program is inputted completely by addition of the character settle code to the character string, so that the operation proceeds to input of the title of the next program in case the process returns from step S007 to step S003.

Upon detection of the end of the character input mode, a decision is made as to whether the MD recorder 1 is currently in its recording mode or not. And if the result of this decision signifies any other mode than the recording mode, i.e., a reproduction mode or a pause mode for example, the character strings stored in the S-RAM 11*a* are extracted with reference to the title settle code such as "^" since steps S003–S007 are looped, and the contents of U-TOC sector 1 representing the titles of the programs are updated (S009).

If the result of the decision at step S008 signifies the recording mode, the system controller 11 waits for the end of the recording mode (S010). The end of the recording mode is detected when the user performs a manipulation to stop the recording or when the MD recorder 1 arrives at the end of the recording after complete play of the entire programs recorded on the CD. And after the end of the recording, the process advances to step S009 to update the contents of U-TOC sector 1.

At the time point of advance to step S009, the character strings stored in the S-RAM 11*a* are, in this example, "abc^def^ghi^jkl^mno" which correspond to the first to fifth programs. The system controller 11 extracts the character strings with reference to "^" to thereby recognize inputs of the characters "abc", "def", "ghi", "jkl" and "mno" corresponding respectively to the first, second, third, fourth and fifth programs. And then the contents of U-TOC sector 1 held in the buffer memory 13 are updated.

Therefore, as intended by the user, the titles corresponding to the first to fifth programs are registered as U-TOC data in the buffer memory 13. At this time, the system controller 11 recognizes "^" as a title settle code while not regarding it as a character, so that "^" is not registered as character information of U-TOC sector 1. The U-TOC data updated in the buffer memory 13 are read out therefrom as recording data at a predetermined time point, whereby the U-TOC data are updated on the magneto-optical disc 90.

Thus, characters representing the titles of plural musical pieces or programs can be inputted, regardless of the playing time of each program, with reference to a title settle code "^" for example as an inter-program partition, hence enabling the user to perform an exact manipulation for inputting desired characters without confusion regardless of the playing time and so forth of each program.

7. Structure of CD-MD Recorder

Next, another preferred embodiment of the present invention will be described. This embodiment represents a composite apparatus where a CD player and an MD recorder (mini disc recording/reproducing apparatus) are combined integrally with each other.

FIG. 8 shows the structure of this embodiment. In the structure of its mini disc recording/reproducing apparatus (MD section), any components functionally equivalent to those in FIG. 1 are denoted by like reference numerals, and a repeated explanation thereof is omitted. The structure of the CD section will now be described below.

A compact disc 30 is loaded in the CD section. In a CD reproduction mode, the compact disc 30 is driven by a spindle motor 31 to rotate at a constant linear velocity (CLV). Data recorded in the form of pits on the compact disc 30 are read out therefrom by an optical head 32 and then are supplied to an RF amplifier 35. In the optical head 32, an objective lens 32*a* is held by a biaxial mechanism 33 and is displaceable in both tracking and focus directions.

The optical head 32 is movable by a sled mechanism 34 in the radial direction of the disc.

In the RF amplifier 35, a focus error signal and a tracking error signal are generated in addition to a reproduced RF signal, and these error signals are supplied to a servo circuit 36. Then the servo circuit 36 generates, out of such focus error signal and tracking error signal, a focus driving signal, a tracking driving signal, a sled driving signal and a spindle driving signal to control the operations of the biaxial mechanism 33, the sled mechanism 34 and the spindle motor 31.

The reproduced RF signal is supplied to a decoder 37. In this decoder 37, the data read out from the compact disc 30 are processed through EFM demodulation and CIRC decoding to become digital audio data which conform with the standard of 16-bit quantization and 44.1 kHz sampling.

In the decoder 37, control data including TOC and sub code are also extracted and then are supplied to a system controller 11 so as to be used for various control actions.

The digital audio data outputted from the decoder 37 are converted into analog audio signal by a D-A converter 38 and then are supplied to a TCD terminal of an output switch 50. The output switch 50 is selectively controlled by the system controller 11.

In a compact disc reproduction mode, the output switch 50 is so actuated that its TCD terminal is selected, whereby the reproduced audio signal obtained from the compact disc 30 is supplied via a volume control circuit 51 and an amplifier circuit 52 to a speaker 53, from which an audio output is emitted.

Meanwhile a magneto-optical disc (mini disc) 90 is loaded in the MD section, where recording and/or reproduction is executed.

In a reproduction mode of the MD section, digital audio data outputted from an audio encoder/decoder 14 are converted into analog audio signal by a D-A converter 15, and then are supplied to a TMD terminal of the output switch 50. In the MD reproduction mode, the output switch 50 is so actuated that its TMD terminal is selected, whereby the reproduced audio signal obtained from the magneto-optical disc 90 is supplied via the volume control circuit 51 and the amplifier circuit 52 to the speaker 53, from which an audio output is emitted.

The compact disc 30 as a signal source can be dubbed to the magneto-optical disc 90.

More specifically, the digital audio data reproduced from the compact disc 30 can be supplied to the audio encoder/decoder 14, so that in the dubbing mode, the digital audio data are encoded through compression and then are stored in the buffer memory 13. Subsequently the stored data are read out at predetermined timing and, after being processed through EFM and so forth, the data are recorded on the magneto-optical disc 90 by the magnetic head 6*a.*

In such composite apparatus consisting of an MD section and a CD section, digital recording from a CD to an MD for example can be executed in response to a predetermined manipulation in a synchro dubbing mode where both the CD and MD sections are controlled simultaneously.

8. Character Editing Operation

Hereinafter an explanation will be given on a processing operation performed when the digital data reproduced in the CD section are transferred to the MD section.

In the MD section, a change of the program reproduced in the CD section is detected from the sub code extracted by the decoder 37. Upon detection of the change of the program, the system controller 11 detects, via the address decoder 10 and the encoder/decoder 14, the recording address at the time point of detection of the change. And thereafter the system controller 11 stores the recording address in the S-RAM 11*a* correspondingly to the relevant program number.

Thus, due to detection of the change point of the program to be dubbed, the program partition point can be set exactly with regard to the audio data to be recorded in the MD section. Here, an explanation will be given on an exemplary case of inputting characters of a program during dubbing between the CD and MD sections.

For example, when an exclusive key for dubbing is manipulated, such as a focus servo, a tracking servo and a spindle servo are actuated in the CD section to read out the TOC data, whereby the CD section is placed in its standby state so that the objective lens 32*a* is positioned at the top of, e.g., the first program. In the MD section also, various servos thereof are actuated as in the CD section to read out the P-TOC and U-TOC data, whereby the MD section is placed in its standby state so that the objective lens 3*a* is positioned at the top of a freely recordable area. In consideration of the difference between an access time to the read position in the CD section and an access time to the recording position in the MD section, such initial operation for dubbing is so performed that the CD and MD sections are placed mutually in the standby state after completion of the preceding process.

In this manner, when the key for starting the dubbing operation is manipulated after the CD and MD sections are both placed mutually in the standby state, the CD section starts its reproduction while the MD section starts its recording. Thereafter, as explained with reference to the flowchart of FIG. 7, the operation proceeds to a desired mode selected by the user's manipulation, so that characters and a character settle code are inputted and then are stored in the S-RAM 11*a* (S001–S007).

And upon completion of the dubbing, the character strings stored in the S-RAM 11*a* are recorded as titles of the programs with reference to the character settle code, whereby the contents of U-TOC sector 1 are updated (S009).

In the other embodiment representing a composite apparatus as an MD-CD player, input of characters is executed during the dubbing as mentioned. However, it is a matter of course that input of characters may be executed in a reproduction mode or a pause mode as well.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. An apparatus for recording programs and program names on a recording medium having at least a program area to record the programs in a management area to manage the positions of the programs recorded in said program area and also to manage the program names, said apparatus comprising:

a character input means for inputting the program names;

a settle input manipulation means for indicating the completion of each character string defining each program name being input by said character input means;

a settle code adding means for adding a settle code to each program name character string in response to each manipulation of said settle input manipulation means during a recording operation for recording each of the programs on the recording medium;

a storage means for storing each program name character string and settle code added thereto by the settle code adding means;

a control means for controlling readout of each program name character string from the storage means, the control means including a separating means for separating each program name character string from each settle code added by said settle code adding means to form a separated program name character string without any settle code; and an updating control means for updating the data in the management area of said recording medium using the separated program name character string without any added settle code.

2. The recording apparatus according to claim 1, wherein said separating means separates the program name character strings from the added settle code by removing said added settle code from the program name character strings with added settle codes that was stored in said storage means.

3. A method of recording programs and program names on a recording medium having at least a program area to record programs and a management area to manage the positions of the programs recorded in said program area and also to manage the program names, said method comprising the steps of:

generating character data as individual character strings representing different program names in response to a manipulation of an element to input character data representative of the different program names;

attaching a settle code to each character string of the character data in response to a manipulation of an element to indicate a completion of each program name;

storing said individual character strings representing individual program names along with the settle code attached in the attaching step in a storage device;

extracting at least one of the individual character strings representing different program names without any attached settle code from the individual character strings representing different program names and attached settle code stored in the storage device; and updating the data in the management area of said recording medium using the at least one of the individual character strings representing different program names without any attached settle code extracted in the extracting step.

4. The recording method according to claim 3, wherein said extracting step is executed by removing said attached settle code from the at least one of the individual character strings representing different program names and the attached settle code stored in the storage device.

5. A dubbing apparatus comprising:

a reproducing means for reading and reproducing a program recorded on a first recording medium;

a recording means for recording the reproduced program on a second recording medium having at least a program area to record programs and a management area to manage the positions of the programs recorded in said program area and also to manage the program name;

a character input means for inputting character data representative of each program name;

a settle input manipulation means for providing an indication of the completion of the inputting of character data representing each program name inputted by said character input means;

a settle code adding means for adding a settle code to the character data representing each program name inputted by said character input means in response to manipulation of said settle input manipulation means during a recording operation for recording each of the programs on the recording medium;

storage means for storing the character data representing each program name inputted by said character input means and settle code added thereto by the settle code adding means;

a control means for controlling a readout operation of the character data representing each program name from the storage means, the control means including a separating means for separating the character data and the added settle code to provide separated character data without any added settle code corresponding to the reproduced programs being recorded in said second recording medium; and an updating means for updating the data in the management area of said second recording medium using said separated character data without any added settle code.

6. The dubbing apparatus according to claim 5, wherein said separating means separates the character data from the added settle code by removing said settle code from the character data representing each program name inputted by said character input means and settle code added thereto that was stored in said storage means.

7. An apparatus for recording programs and program names on a recording medium having at least a program area to record the programs and a management area to manage positions of the programs recorded in said program area and also to manage the program names, said apparatus comprising:

a character input device configured to input the program names;

a settle input element configured to input an indication that a complete program name has been inputted by said character input device;

a settle code adder coupled to said settle input element and configured to add a settle code to a character string indicating an input program name in response to manipulation of said settle input element during a recording operation for recording each of the programs on the recording medium;

a buffer configured to store each program name character string and settle code added thereto by the settle code adding means as buffer data;

a first controller configured to control storage of each program name character string and added settle code in the buffer as the buffer data and to separate each program name character string from each settle code added by said settle code adding means to form a separated program name character string without any settle code; and an update controller configured to update the data in the management area of said recording medium using the separated program name character string without any added settle code.

8. The recording apparatus according to claim 7, wherein said first controller is configured to separate each program name character string from each settle code added by the settle code adder by removing each added settle code from the buffer data stored in said buffer.

9. A dubbing apparatus comprising:

a reproducing device for reading and reproducing a program recorded on a first recording medium;

a recording device for recording the reproduced program on a second recording medium having at least a program area to record programs and a management area to manage the positions of the programs recorded in said program area and also to manage the program names;

a character input device configured to input character data representative of the program name;

a settle input element configured to input an indication that a complete program name has been inputted by said character input device;

a settle code adder configured to add a settle code to the character data representative of the program name inputted by said character input device in response to manipulation of said settle input element during a recording operation for recording each of the programs on the recording medium;

a buffer configured to store the character data representative of the program name inputted by said character input device and settle code added thereto by the settle code adder as buffer data;

a first controller configured to control storage of the character data representative of the program name and the settle code added thereto by said settle code adder as the buffer data in the buffer and to separate the character data representative of the each program name from each settle code added by the settle code adder to form separated character data representative of each program name without any settle code; and an update controller configured to update the data in the management area of said second recording medium using the separated character data representative of each program name without any settle code.

10. The dubbing apparatus according to claim 9, wherein said first controller is configured to separate the character data representative of each program name from each settle code added by the settle code adder by removing said settle code from the buffer data stored in said buffer.

* * * * *